Mar. 13, 1923.
I. M. MARCY
DIFFERENTIAL GEAR
Filed Apr. 14, 1922
1,448,670
2 sheets-sheet 1
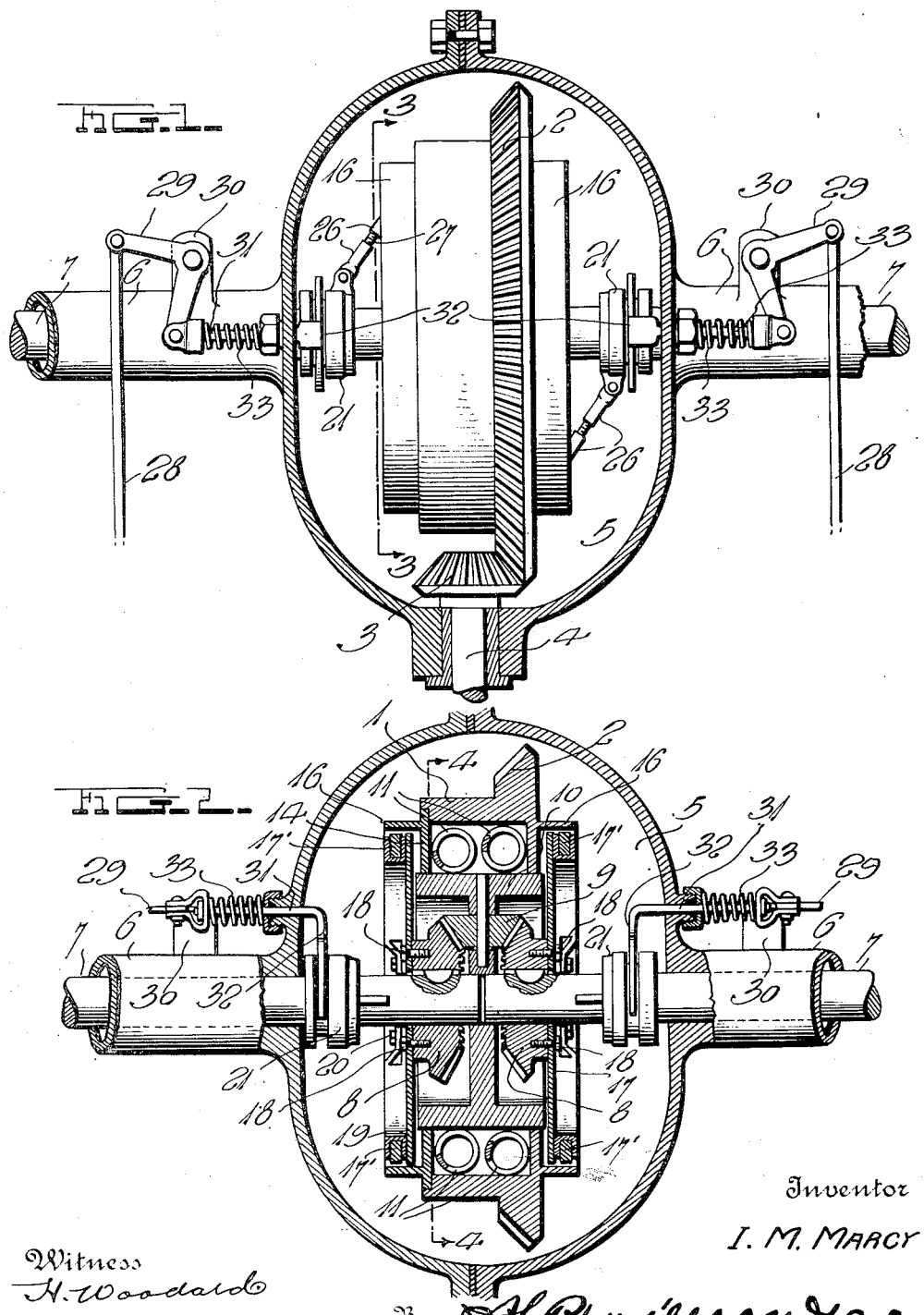
Inventor
I. M. MARCY Mar. 13, 1923.
I. M. MARCY
DIFFERENTIAL GEAR
Filed Apr. 14, 1922
1,448,670
2 sheets-sheet 2
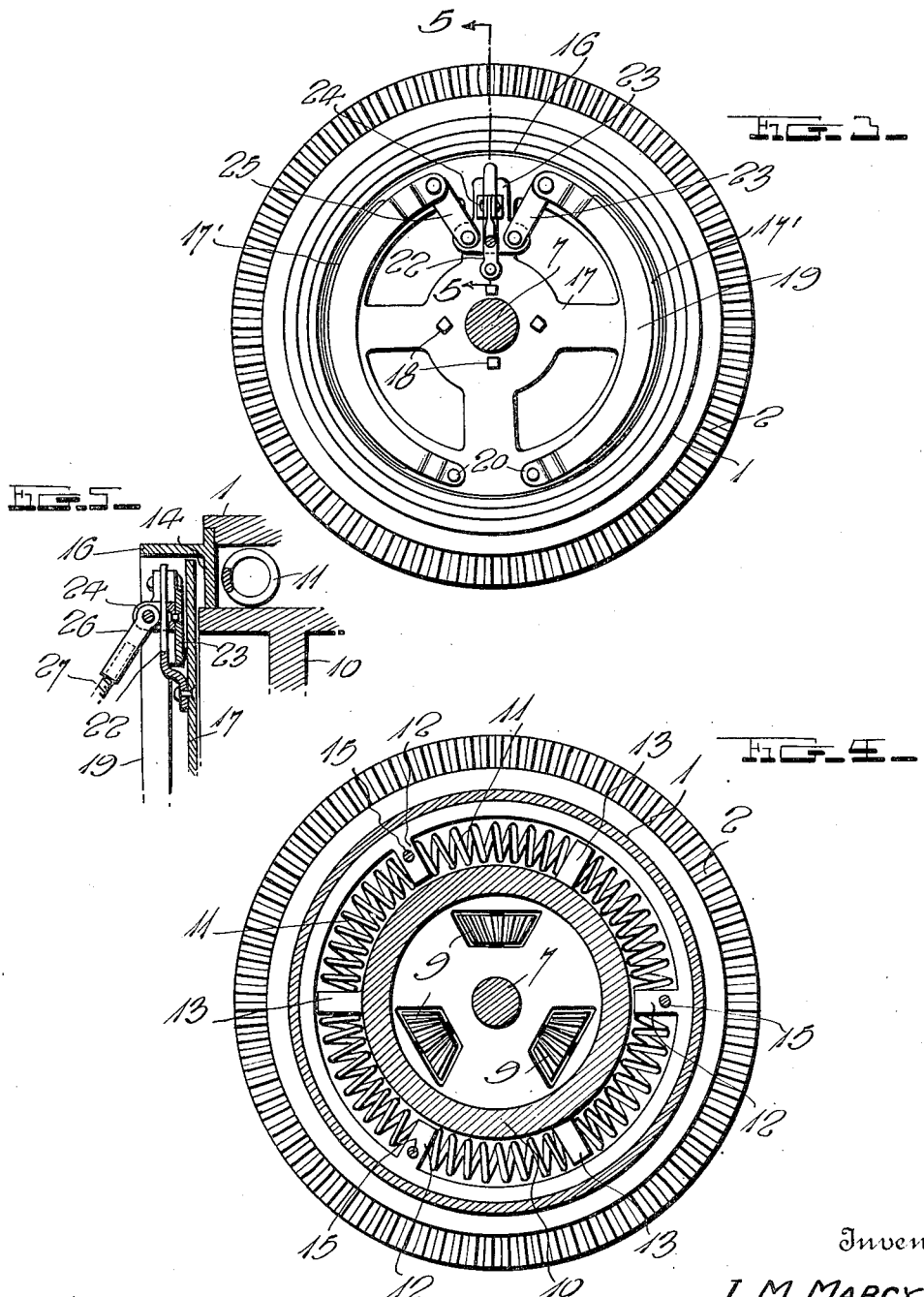
Witness
H. Woodard
Inventor
I. M. Marcy
By H. B. Wilson &co.
Attorneys Patented Mar. 13, 1923.

1,448,670

UNITED STATES PATENT OFFICE.

IRA M. MARCY, OF CHATTANOOGA, TENNESSEE.

DIFFERENTIAL GEAR.

Application filed April 14, 1922. Serial No. 552,688.

*To all whom it may concern:*

Be it known that I, IRA M. MARCY, a citizen of the United States, residing at Chattanooga, in the county of Hamilton and State of Tennessee, have invented certain new and useful Improvements in Differential Gears; and I do declare the following to be a full, clear, and exact description of the invention, such as will enable others skilled in the art to which it appertains to make and use the same.

This invention relates to an improvement in differential gearing and one object of the invention is to provide clutch means associated with the gearing so that one or both of the axle sections may be locked to the body portion of the gearing and thus a wheel positioned upon a slippery portion of a road or resting in a mud puddle prevented from spinning, while the second wheel remains stationary upon dry ground.

Another object of the invention is to so construct this clutch that in case the gears of the differential should become stripped, the axle sections may be frictionally locked to the drum or body portion of the gear and the rear wheels turned as though upon a solid axle.

Another object of the invention is to so construct this differential gearing that springs may be provided to act as shock absorbers and prevent jolts when the automobile is first started.

Another object of the invention is to so construct this differential that the clutch elements may be carried by the axle sections and moved into and out of an operative position by actuating means carried by the axle casing.

Another object of the invention is to provide a gearing which can be very easily taken apart and put together.

Another object of the invention is to provide the gearing with clutch means in the form of arms movable into and out of engagement with the drum of the differential, these arms being so mounted that they may be brought into tight engagement with the drum and pressure upon the arms equalized so that in case one of the clutch arms is worn more than the other, the arms may still have proper engagement with the drum.

Another object of the invention is to so construct this improved clutch means that the actuating means for the clutches may include pivotally mounted bell crank levers carried by standards of the axle casing and rods which will be extended forwardly for connection with operating levers adjacent the operator of the automobile.

This invention is illustrated in the accompanying drawings, wherein:

Figure 1 is a view showing the improved differential in top plan with the differential housing shown in section.

Figure 2 is a sectional view through the differential taken longitudinally of the axle.

Figure 3 is a sectional view taken along the line 3—3 of Fig. 1.

Figure 4 is a sectional view taken along the line 4—4 of Fig. 2.

Figure 5 is a sectional view taken along the line 5—5 of Fig. 3.

The differential is provided with a drum 1 having the usual gear 2 which meshes with the gear 3 carried by the shaft 4 which constitutes the main drive shaft. This shaft 4 is journaled in the bearing in the forward portion of the differential housing 5 which is provided intermediate the casing sections 6 in which the sections 7 of the rear axle are rotatably mounted. It is of course obvious that instead of the gear 2 meshing with a gear 3, the shaft 4 could be provided with a worm for meshing with a co-operating worm carried by the drum. The inner end portions of the rear axle sections carry the usual gears 8 which mesh with the gears 9 which are rotatably mounted adjacent the center of the drum. The hub portion 10 of this drum which carries the gears 9 is separate from the rim portion which carries the gear 2 and the rim portion is provided with a pocket to receive springs 11 which will be engaged by abutment fingers 12 and 13 carried by and extending in radiating relation to the rim and hub. It will thus be seen that when the rim portion of this drum is turned from the drive shaft 4, the springs will be compressed and will then impart movement to the hub portion thus forming shock absorbers taking up jolts which are ordinarily received when an automobile is first started. A retainer ring 14 holds the springs in place and is secured by fasteners 15 which extend through the radiating fingers 12 of the outer rim. Annular flanges 16 are provided at the sides of the drum and constitute brake drums for engagement by clutches.

It has been found that when one wheel of an automobile is positioned in a mud-hole and the other upon dry ground, the wheel which is positioned in the mud-hole will have a tendency to spin and the wheel which is upon dry ground will stand still, this being due to the fact that the wheel which is in mud-hole is left free to turn very easily and therefore this wheel will turn and the other will remain stationary. Since this wheel which is turning rapidly does not have a good grip upon the ground, it is sometimes impossible to extract the automobile from the mud-hole without assistance, whereas if the other section carrying the wheel resting upon dry ground can be locked to the drum portion of the differential, this wheel can be caused to rotate and the automobile can pull itself out of the mud-hole. A clutch has been provided for each end portion of the axle so that either axle section may be locked to the differential drum or both sections if desired. It should be further noted that if the teeth should be stripped from the gears 8 or 9, the axle sections could not be properly rotated but that with the clutches provided, one or both of the axle sections may be locked to the differential and the rear axle thus converted into a substantially solid axle instead of a sectional axle until new gears may be provided. Since the clutches for the two axle sections are of the same construction, only one will be described in detail and it will be understood that the following description applies to both.

Each of the gears 8 carries a disk 17 which is secured by removable fasteners 18 so that the disk may be disconnected from the gear when desired. The disk may be solid or may have portions thereof cut out as shown in Fig. 3 to reduce the weight of the disk. Gripping shoes 19 which are curved longitudinally to provide gripping shoes which will conform to the contour of the disk 17 are pivotally connected with the disk as shown at 20 and extend about the disk 17 adjacent the periphery thereof. These gripping shoes may be formed each as a single piece if so desired, but in the preferred form each will be provided with a longitudinally extending channel and receiving a filler 17' which may be removed when worn off and a new filler put in place. This filler will be formed of material which will have a firm grip upon the inner faces of the annular flanges 16 and serve to firmly grip the flanges and cause the shaft section or sections to be firmly locked to the drum of the differential. A collar 21 is mounted upon the axle section and keyed to it so that it may move longitudinally of the axle section but will be prevented from having rotary movement upon the axle. A guide arm or pin 22 is pivotally connected with the disk 17 and extends radially thereof between the free ends of the shoes. This guide 22 overlaps a plate 23 and has its free end portion extending between the arms of a bearing bracket 24 which is pivotally connected with this plate 23. It will thus be seen that the plate 23 and guide 22 may have limited movement and thus permit the gripping means to operate properly. Links 25 are pivotally connected with the free end portions of the gripping shoes 19 and with the inner end portion of the plate 23 upon opposite sides of the stem or finger 22 and therefore when this plate is moved radially of the disk, the gripping shoes will be moved into or out of engagement with the annular flange 16 according to the direction in which the plate is moved. A longitudinally extending push and pull bar connects the collar 21 with the bearing 24 and in the present illustration has a turn-buckle construction with its end sleeves 26 pivotally connected with the clevis and collar and these end sleeves connected by a threaded rod 27. When the collar is moved towards the disk 17, the plate 23 will be moved to swing the free end portions of the gripping shoes away from each other and the liners will be brought into engagement with the inner surface of the annular flange 16. If one of the liners becomes worn to a greater extent than the other, the pivotal mounting of the guide stem 22, plate 23 and bearing bracket 24 will permit the gripping shoes to assume the proper position and permit the shoes to properly grip the flange.

In order to impart movement to the collars 21 there have been provided rods 28 which extend longitudinally of the automobile and will have their forward ends connected with suitable levers or treadles by means of which they may be selectively moved to bring either or both of the clutches into engagement with the side flanges 16. These bars 28 have their rear ends connected with the bell crank levers 29 which are pivotally mounted upon brackets 30 of the rear axle casing and have their forwardly extending arms pivotally connected with the shanks 31 of the collar-engaging forks 32. Springs 33 are provided to yieldably hold the forks in a normal position with the clutches inoperative.

There has thus been provided clutch means which is constructed that either of the axle sections may be locked to the differential drum and caused to be positively driven with the drum. There has also been provided a clutch so constructed that the gripping shoes or arms thereof may have very good engagement with the annular side flanges of the brake drum and each shoe of a clutch brought into firm gripping engagement with the collar. The rear axle may therefore have its end section connected after the manner of an ordinary differential connection or one or both sides may if desired be locked to the differential.

I claim:

1. In a structure of the character described, an axle having separate end sections, a differential operatively associated with said axle sections, annular flanges extending from the sides of the differential, clutches turning with the axle sections and positioned within the flanges and each including a carrier, gripping arms pivotally connected with the carrier and movable into and out of gripping engagement with the inner face of the annular flange, and means for moving said arms and holding the arms in adjusted positions.

2. The structure of claim 1 having each gripping arm in the form of an arcuate strip having a pocket open at its outer side, and a filler fitting in the pocket and extending beyond the same for engaging the inner face of the annular flange when the arm is swung outwardly.

3. The structure of claim 1 having the gripping arms each pivotally mounted and movable substantially radially of the carrier, links pivotally connected with the free ends of the arms, a plate slidable radially of the carrier between the free ends of the arms and having the links pivotally connected therewith, means for imparting sliding movement to the plate, and means for guiding movement of the plate.

4. The structure of claim 1 having the gripping arms each pivotally mounted and movable substantially radially of the carrier, links pivotally connected with the free ends of the arms, a plate slidable radially of the carrier between the free ends of the arms and having the links pivotally connected therewith, means for imparting sliding movement to the plate, and means for guiding movement of the plate, a clip loosely connected with said plate and said guide means consisting of a stem pivotally connected with said carrier and extending substantially radially of the carrier and slidably passing through the eye.

5. The structure of claim 1 having the gripping arms each pivotally mounted and movable substantially radially of the carrier, links pivotally connected with the free ends of the arms, a plate slidable radially of the carrier between the free ends of the arms and having the links pivotally connected therewith, collars slidable upon the axle sections, arms loosely connected with the collars and plates for imparting movement to the plates when the collars are moved longitudinally of the axle sections, and means for imparting movement to said collars.

6. The structure of claim 1 having the gripping arms each pivotally mounted and movable substantially radially of the carrier, links pivotally connected with the free ends of the arms, a plate slidable radially of the carrier between the free ends of the arms and having the links pivotally connected therewith, collars slidable upon the axle sections, arms loosely connected with the collars and plates for imparting movement to the plates when the collars are moved longitudinally of the axle sections, a differential housing having axle receiving tubes extending therefrom, forks engaging the collars and having shanks slidably passing through the sides of the differential housing, levers pivotally connected with the axle receiving tubes and connected with the shanks to impart sliding movement thereto when the levers are moved, and spring means yieldably holding the shanks of the forks against movement.

In testimony whereof I have hereunto set my hand.

IRA M. MARCY.